Nov. 7, 1933.    R. T. OSMAN    1,933,873
MOTOR DRIVEN VEHICLE
Filed July 3, 1929    2 Sheets-Sheet 1
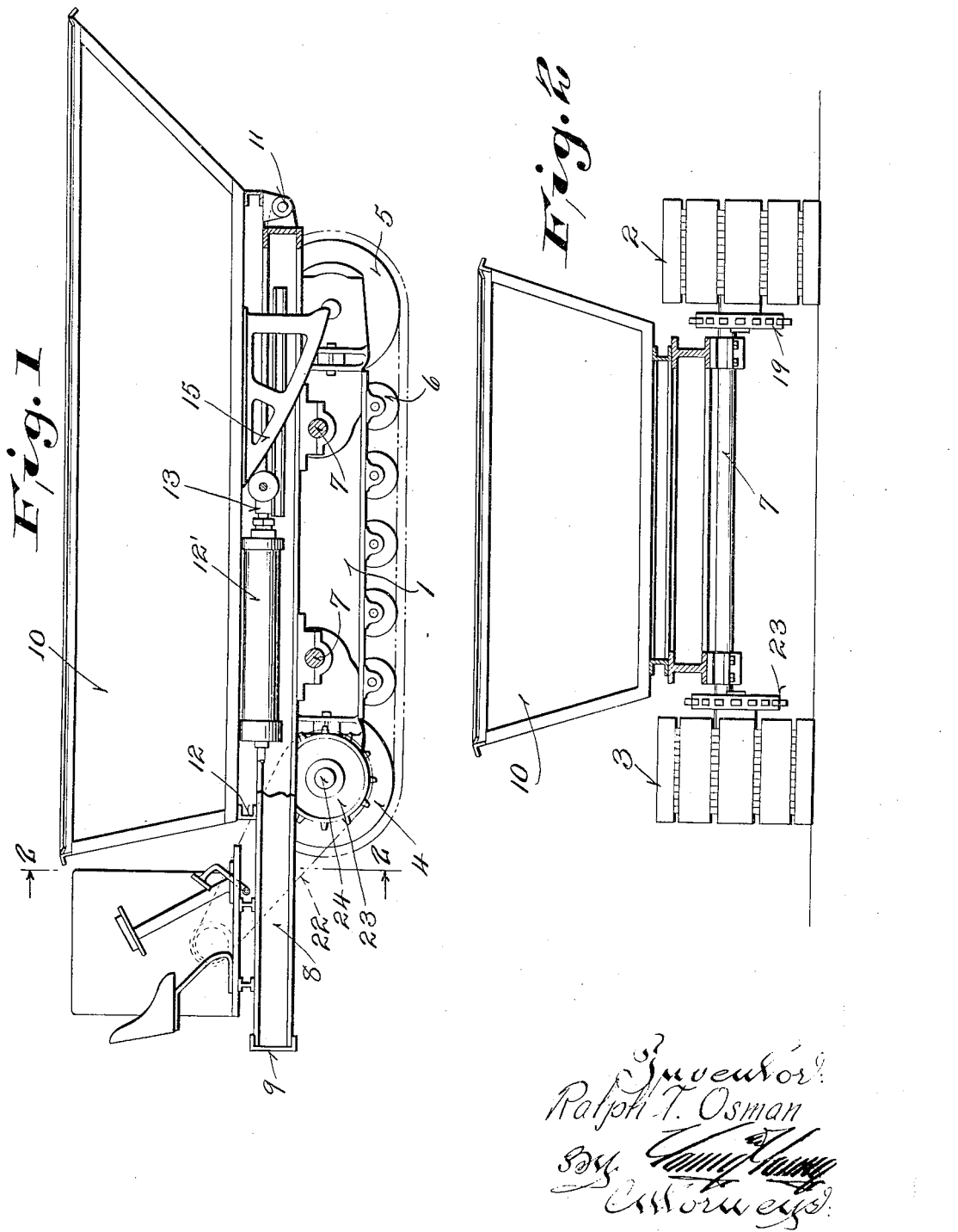

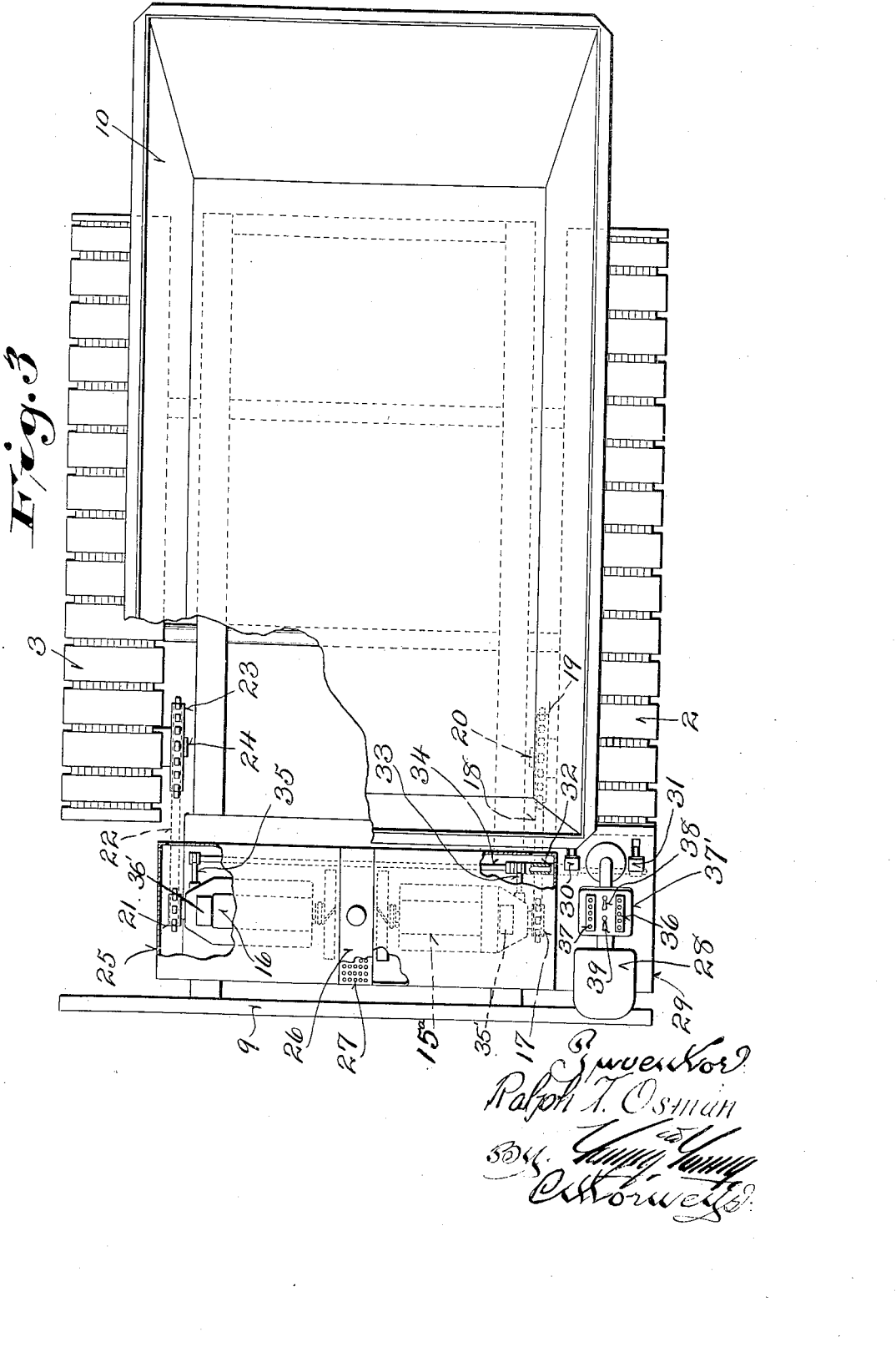

Patented Nov. 7, 1933

1,933,873

UNITED STATES PATENT OFFICE 1,933,873

MOTOR DRIVEN VEHICLE

Ralph T. Osman, Milwaukee, Wis., assignor to Koehring Company, Milwaukee, Wis., a corporation Application July 3, 1929, Serial No. 375,795

2 Claims. (Cl. 180—9.2)

This invention relates to motor driven vehicles and more particularly to that type of vehicles commonly known as continuous track trucks with especial reference to a load carrying machine having a dump body for carrying and dumping dirt or other material.

This type of machine is provided with suitable means for tilting or otherwise controlling the body to dump the load, and suitable driving and steering mechanism.

One of the objects of the invention is the provision of a continuous track truck having a comparatively large load capacity, and in which the driving and operating means are so located and positioned as to provide the most convenient operation of the truck in loading, driving and dumping.

A further object is the provision of a continuous track truck provided with plurality of tracks, each track being operable by its individual motor and each motor individually and independently controlled by the operator.

Another object is to provide a continuous track truck in which the location and position of the motors and control means with relation to the tracks and body will provide extreme flexibility in the operation and control of the device.

Further objects will appear from the detailed description to follow and from the appended claims.

Fig. 1 is a side elevation, partially in section, of a continuous track truck constructed in accordance with my invention.

Fig. 2 is a transverse section taken on line 2—2 of Fig. 1.

Fig. 3 is a top plan view of the truck, portion being broken away to more fully illustrate the operating mechanism.

Referring now to the drawings in detail, my invention as illustrated comprises the truck frame 1, on which are mounted the usual continuous tracks 2 and 3. These tracks are of the usual well known construction and need no further description here, they are supported on the rear truck wheels 4 and front wheels 5, and are provided with the usual alignment rollers 6. The two sides of the truck frame are connected together and supported in alignment by means of the transverse shafts 7 on which is mounted the rectangular main frame 8, the rear cross bar 9 extending outwardly on each side to provide a suitable rear bumper.

The body 10 may be of the usual dump car type with means for dumping the load in any suitable manner, in the construction shown the front end is pivoted or hinged at 11 adjacent the front end of the main frame 8, the rear end resting on the cross bar 12 which forms a part of the main frame.

The body may be raised and tilted forward, for dumping the load, by the hydraulic means illustrated in Fig. 1 which in the present instance comprises the cylinder 12' which is provided with a suitable piston for moving forward the cross head 13. Rollers 14 are mounted on the cross head and engage the cam 15 when the cross head is moved forward thus raising the body to dumping position.

The hydraulic cylinder is controlled by the operator through any of the well known means in common use for such purposes and which is not shown in the drawings as it forms no part of the present invention.

The main frame 8 extends rearwardly beyond the body 10 and has mounted thereon a plurality of suitable independently controlled motors for independently driving the continuous tracks 2 and 3. The motors 15a and 16 being arranged to drive the tracks 2 and 3 respectively. The track 2 is driven through the motor sprocket 17, the chain 18, and the sprocket 19 on the drive shaft 20. The track 3 is driven in a similar manner through the motor sprocket 21, chain 22, and sprocket 23 on the drive shaft 24, the motors being in alignment with each other and parallel with the axes of the drive shafts 20 and 24.

The motors are enclosed in a suitable housing 25, a single centrally located radiator 26 being provided and having a side air inlet as shown at 27.

The operator's seat 28 is located on the running board 29 and in a position to permit the operator to conveniently operate the clutch pedals 30 and 31, the pedal 30 controlling the clutch of the motor 15 through the hollow shaft 32 and clutch shaft 33, and the pedal 31 operating the clutch of motor 16 through the shaft 34 and clutch shaft 35. Each motor is provided with a standard automatic gear shift 35' and 36', controlled by buttons 36 and 37. The buttons are mounted on a suitable instrument board 37' which is in turn conveniently mounted on the running board within easy reach of the operator.

Individual throttle control levers 38 and 39 are also mounted on the instrument board for independently controlling their respective motors.

In operation the truck is always under the easy and convenient control of the operator, the gear shift, clutch and throttle of each motor being at all times independently controlled, the speed or direction of either motor and its corresponding track may be determined by the operator and an efficient flexibility of movement is obtained.

It will be noted that in the construction illustrated and described herein I have provided a construction which is compact and convenient to operate, the body being easily accessible from all sides for loading.

While I have shown but one form of my invention it is obvious that it may be embodied in other forms covered and defined by the claims.

Having thus described my invention, what I claim as new and desire to secure by Letters Patent is:

1. In a dual controlled dump truck, a pair of spaced endless tread traction devices, a pair of supporting shafts connecting said traction devices together, the aforesaid elements forming a rigid supporting unit, a rectangular channel frame, including a pair of longitudinal channels arranged above said shafts and between said endless tread devices, the ends of said frame extending out beyond the ends of the tread devices, a bull-dozing dump body pivotally carried by the front end of the rectangular frame, a cross frame member disposed on the longitudinal channels for supporting the other end of the dump body when in lowered position, means for dumping and lowering said body, the rear portion of said rectangular frame extending materially beyond the rear axle and said endless traction members, a pair of internal combustion engines disposed on said rectangular frame extension, each of said engines having independently operable clutch and transmission actuating devices, an operator's platform arranged adjacent one of the endless traction devices, adjacent one of said engines and to the right of the dump body, so as to give an unobstructed view forward on one side of the machine, separate drive means between each engine and one endless track, and independent dual control means on said platform controlling the clutch and transmission means of each of said engines.

2. In a dual engine controlled bull-dozing dirt moving unit, a pair of spaced endless belt traction devices, a shaft connecting said endless belt traction devices together, said shaft being disposed intermediate the center and rear end of the traction device, a supporting frame carried by said axle at a point substantially intermediate the ends of said frame, the said frame extending materially beyond the rear end of the traction devices, a pair of internal combustion engines having the usual clutch, throttle and transmission devices, said engines being disposed on said frame extension, a bull-dozing dump body, pivotally carried by the front end of said supporting frame and adapted to rest on the frame when lowered, means for raising said body to dumping and bull-dozing position and lowering of same, an operator's platform arranged to the rear of and at one side of the dump body over one of said endless traction devices, means for independently controlling the clutch, throttle and transmission of each engine, by an operator from said platform, and means to drive one of the endless traction devices from each internal combustion engine, said engines constituting balancing means for said dump body, when the dump body is loaded.

RALPH T. OSMAN.